US005864939A

United States Patent [19]

In-Seok

[11] Patent Number: 5,864,939

[45] Date of Patent: Feb. 2, 1999

[54] METHOD OF MANUFACTURING A CORK EXTRACTING DEVICE

[76] Inventor: Kim In-Seok, 160, Chimsan 2 Dong, Buk-Gu, Daegu, Rep. of Korea

[21] Appl. No.: 732,874

[22] Filed: Oct. 16, 1996

[30] Foreign Application Priority Data

Jan. 13, 1996 [KR] Rep. of Korea ...................... 1996-603

[51] Int. Cl.$^{6}$ ................................ B23P 11/00; B67B 7/04

[52] U.S. Cl. ................................ 29/509; 29/517; 81/3.37; 81/3.45; 81/3.48

[58] Field of Search .............................. 29/515, 516, 517, 29/509; 81/3.45, 3.37, 3.29, 3.36, 3.47, 3.48

[56] References Cited

U.S. PATENT DOCUMENTS

| | | | |
|---|---|---|---|
| 834,603 | 10/1906 | Ansley | 81/3.45 |
| 4,097,163 | 6/1978 | Dubuque | 29/517 X |
| 4,836,060 | 6/1989 | Klefbeck | 81/3.29 |
| 5,606,790 | 3/1997 | Laue | 29/517 |

FOREIGN PATENT DOCUMENTS

| | | | |
|---|---|---|---|
| 751841 | 7/1933 | France | 81/3.36 |
| 952572 | 11/1949 | France | 81/3.45 |
| 4988 | 11/1894 | Germany | 81/3.37 |
| 288752 | 9/1931 | Italy | 81/3.45 |
| 411237 | 7/1945 | Italy | 81/303 |

*Primary Examiner*—S. Thomas Hughes

[57] ABSTRACT

A method of manufacturing a cork extracting device containing a supporting shaft and a coil-type screw and in which the supporting shaft and the screw are separately made and then connected together, which comprises providing a bottom end portion of the supporting shaft with a coupling portion having a coupling aperture disposed therein, providing a coiled screw with a screw coupling portion at the top end thereof, inserting a guiding tube into the coupling portion of the shaft, the guiding tube having a center hole which extends therethrough and branches at the end thereof as a hooking groove, inserting the screw coupling portion into the hole of the guiding tube and bending the end of the screw coupling portion to engage with the hooking groove.

2 Claims, 4 Drawing Sheets

METHOD OF MANUFACTURING A CORK EXTRACTING DEVICE

BACKGROUND AND SUMMARY OF THE INVENTION

FIELD OF THE INVENTION

The present invention relates to an improved cork screw or cork extracting device having a bottle mouth supporter, and more particularly to a cork extracting device which is made such that a supporting shaft, which ascends, descends, and rotates within a bottle mouth supporter and a screw, are separately formed. The screw coupling portion at the top of the screw is inserted into a coupling portion formed at the bottom of a supporting shaft, and then the supporting shaft and the screw are assembled together to form an integral unit by either press-fixing both ends of the exterior of the coupling shaft to the screw or by sealing to fix the screw through the application of pressure using a knurling mesh at the exterior of the coupling portion. That is, a knurling tool is utilized to apply pressure to the knurling mesh for fixing the coupling portion of the supporting shaft to the screw coupling portion. When the screw is assembled the center axis of the supporting shaft and the center axis of the screw are in alignment. Also, the operating lever of the device can be coated with a synthetic resin so as to make the gripping of the operating lever more effective.

In conventional cork extracting devices having a bottle mouth supporter, since the screw is made by cutting and processing and the bottom end of supporting shaft with guide grooves and a handle is made by cutting and processing, it is difficult in these cutting steps to achieve a device in which the components thereof contain a common central axis. In fact in the prior art cork screws, the screw is frequently canted to one side of the cork screw, therefore making it difficult to effectively extract the cork from the bottle.

And, even when a coupling portion is made at the bottom end of the supporting shaft and a coil type screw is fixed by welding, there has been the problem of achieving an alignment of the axis of the shaft and the screw along a common, center axis during welding operation.

Therefore, the present invention is directed to providing a cork extracting device which solves such problems.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Hereinafter, a preferred embodiment of the present invention will be described in more detail with reference to the accompanying drawings.

Figure 1:
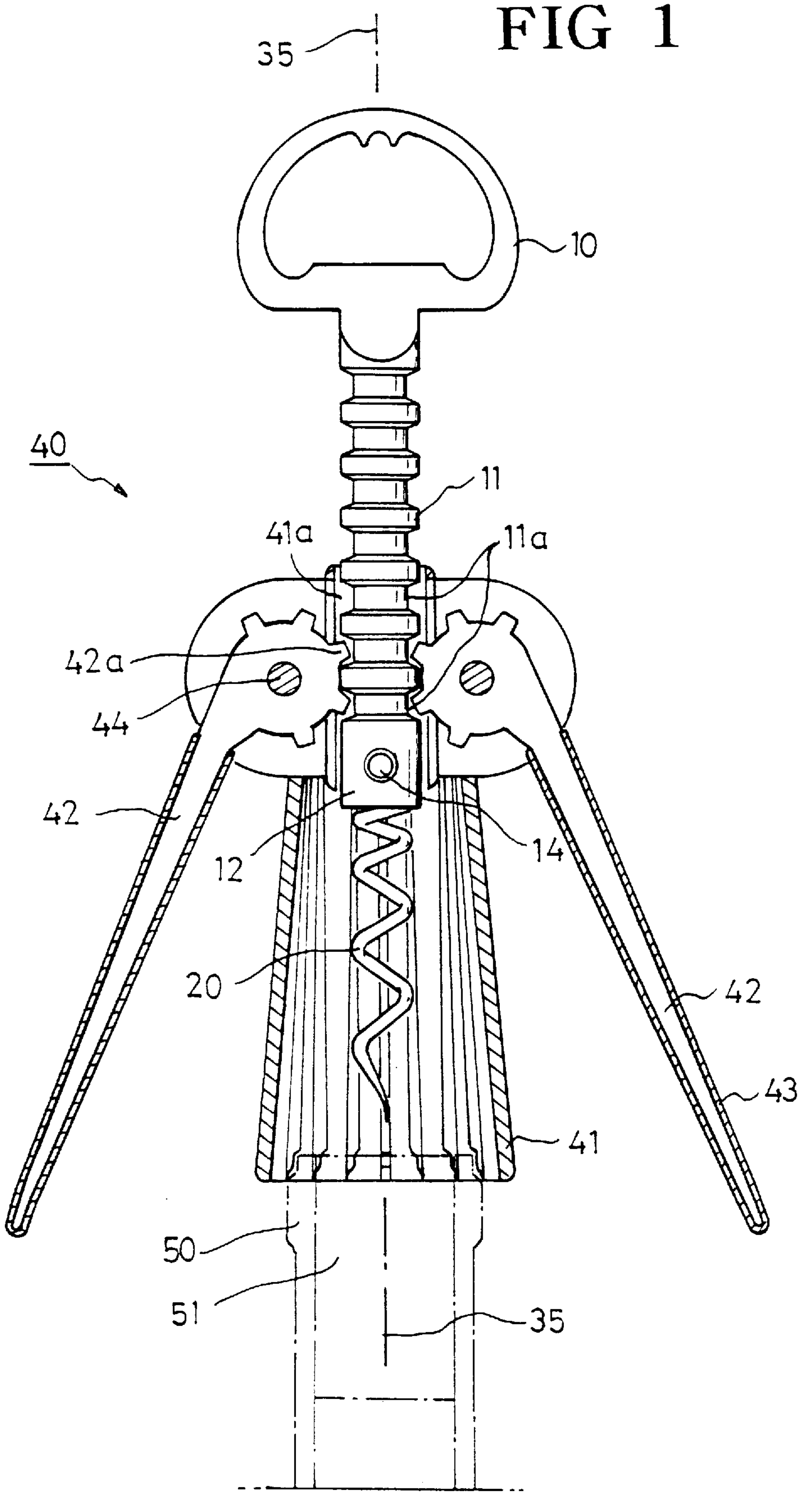
FIG. 1 is a sectional view of the entire construction of the present invention.

As shown in FIG. 1, the cork extracting device 40 comprises a metal-made operating lever 42 which is rotatably fixed by a pivot pin 44 to both sides of guide slots 41*a* of a cylindrical supporting shaft 11 disposed at the top of the bottle mouth supporter. Guide protrusions 42*a* of the operating lever 42 are adapted to engage with the guide grooves 11*a* of the supporting shaft 11. A handle 10 is provided at a top end of the supporting shaft 11. A screw 20 is provided at the bottom of the supporting shaft 11 for drawing out a cork 51 located in the mouth 50 of the bottle. However, according to the present invention, the supporting shaft and the screw are separately made and then they are assembled so as to enable the cork extracting device to easily and precisely extract the cork from the bottle. Advantageously, the operating lever 42 is coated with a synthetic resin coating layer 43 so as to facilitate the gripping of the operating lever 42.

Figure 2:
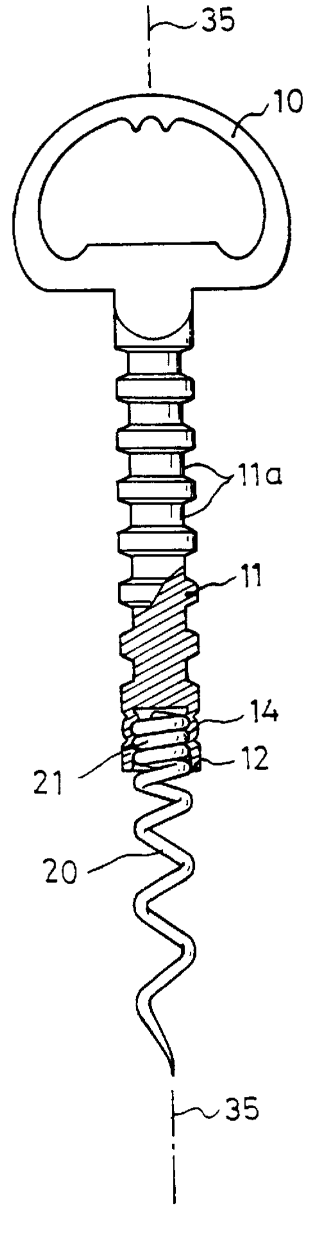
FIG. 2 is a sectional view of the supporting base showing the screw assembly in accordance with the present invention.
Figure 3:
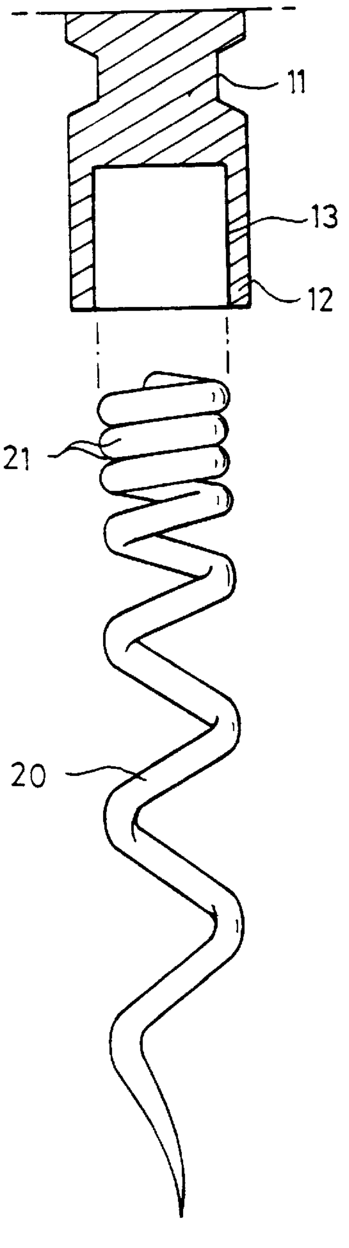
FIG. 3 is a fragmentary magnified view prior to assembling the screw in accordance with the present invention.
Figure 4:
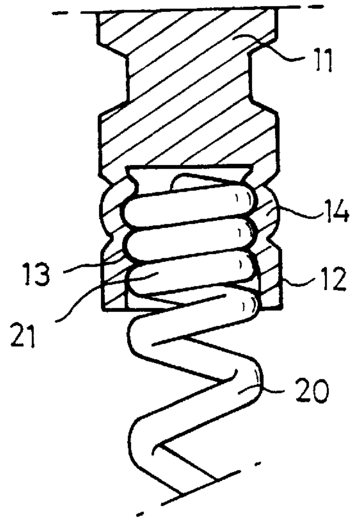
FIGS. 4(A) and FIG. 4(B) are magnified sectional views showing the assembled screw portions, in accordance with the present invention.
Figure 4:
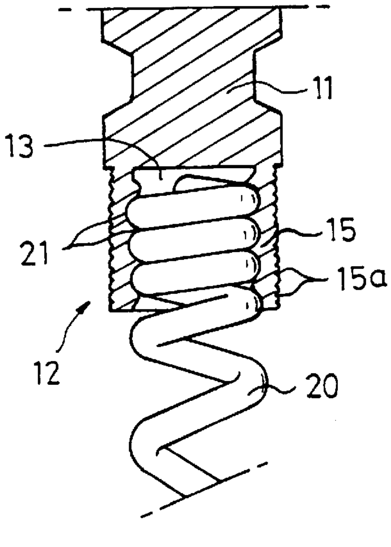

In FIG. 2 to FIG. 4, a separately assembled supporting shaft and coil-type screw are shown, wherein the coupling portion 12 is provided with a coupling hole 13 formed in the bottom end of the screw-supporting shaft 11. The coil-type screw 20 has an upper end formed as a screw coupling portion 21 made by compressing the coils so that they closely contact each other. The screw coupling portion 21 is inserted into the coupling portion 12, and then both sides of the exterior portion of the coupling portion 12 is press-fixed whereby the press-fixed portion 14 is made to conform to the concave and convex shape of the screw coupling portion 21 of the coil-type screw 20. Alternatively, the screw coupling portion 21 is fixed by applying pressure utilizing a knurling mesh 15*a* to the exterior of the coupling portion 12 and forming a sealing portion 15. The screw end has a center axis 35.

Figure 5:
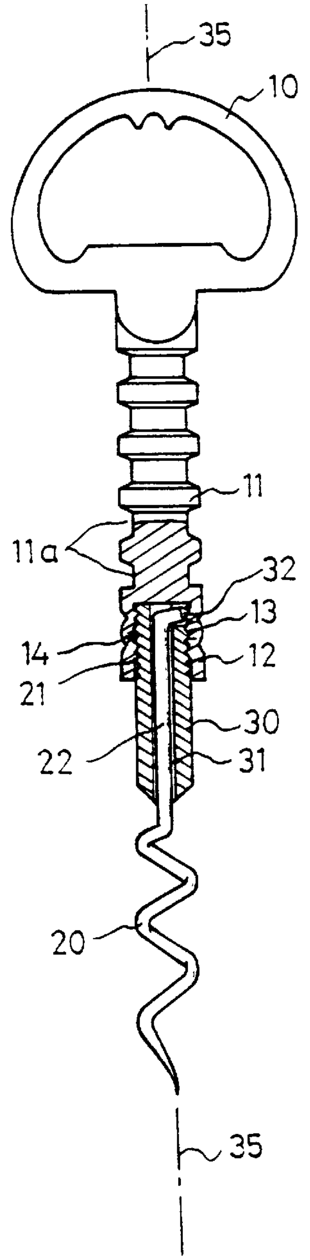
FIG. 5 is a sectional view of the supporting-base showing another embodiment of the screw assembly in accordance with the present invention.
Figure 6:
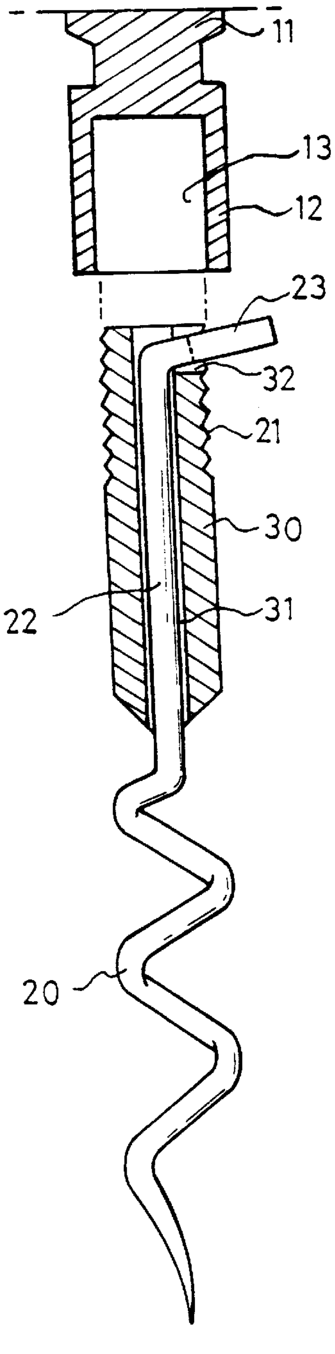
FIG. 6 is a fragmentary sectional view of the screw of FIG. 5 prior to assembly.
Figure 7:
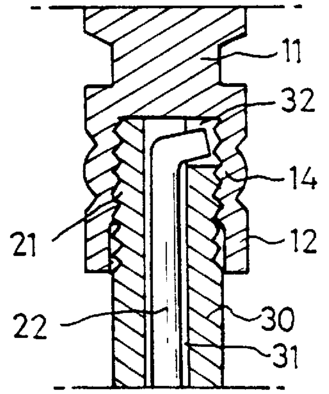
FIGS. 7(A) and 7(B) are magnified sectional views showing the assembled screw portions, in accordance with FIG. 6.
Figure 7:
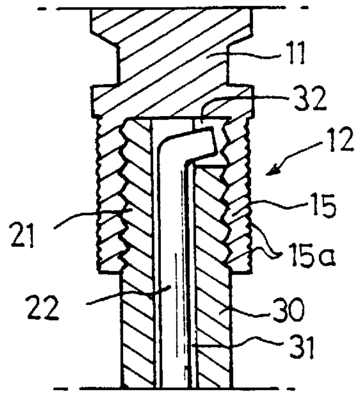

In FIG. 5 to FIG. 7, another coil-type screw assembly of the present invention is shown, wherein a coil-type screw 20 is assembled into the coupling portion 12 of the supporting shaft 11, in which the upper end of the coupling portion 22 of the coil-type screw 20 is inserted into a center hole 31 of a guide tube 30 which is formed with a screw coupling portion 21 and a hooking groove 32. A top end protruding portion is bent toward the hooking groove 32. A bent portion 23 is cut within the hooking groove 32 and fixed with the guide tube 30. The screw coupling portion 21 is formed at the upper end of the guide tube 30, which in turn is inserted into the coupling portion 12, and then the exterior of the coupling portion 12 is press-fixed to form a press-fixed portion 14. Alternatively, a sealing portion 15 can be formed by sealing whereby assembly of the screw is accomplished.

In the case of bending the upper end connecting portion 22 of the screw 20, as shown in FIG. 6, it is possible to bend its length within a certain margin and then cut any external surplus portion at the end of the bent, protruded portion 23.

Figure 8:
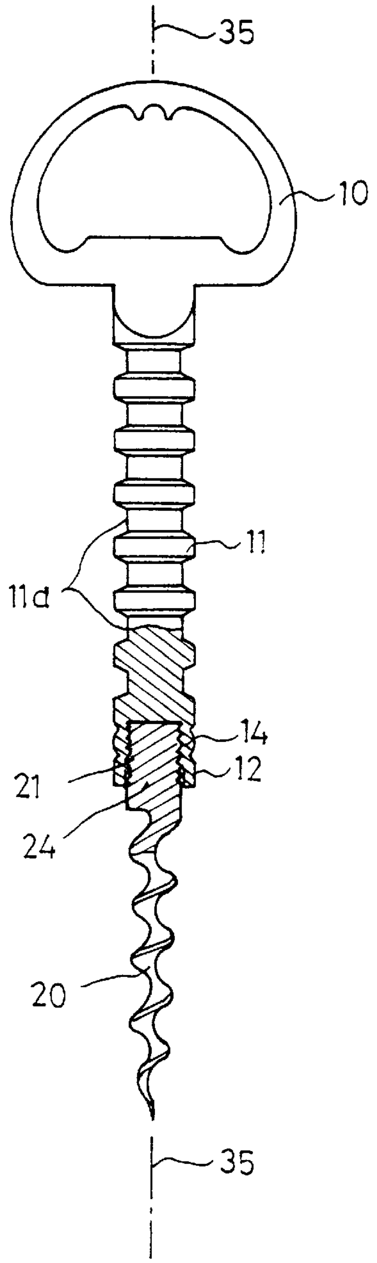
FIG. 8 is a sectional view of the supporting base, assembled by cutting the screw of the present invention.
Figure 9:
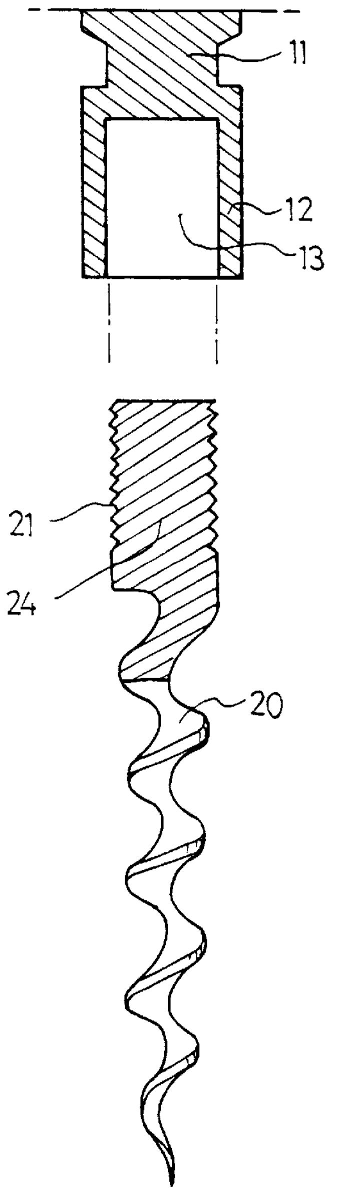
FIG. 9 is a fragmentary sectional view of the screw assembly portion in accordance with FIG. 8.
Figure 10:
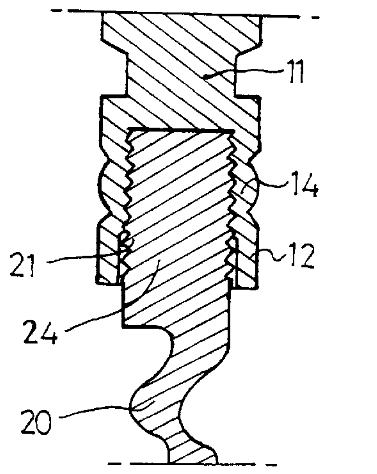
FIGS. 10(A) and 10(B) are magnified sectional views of the screw assembling portion in accordance with FIG. 9.
Figure 10:
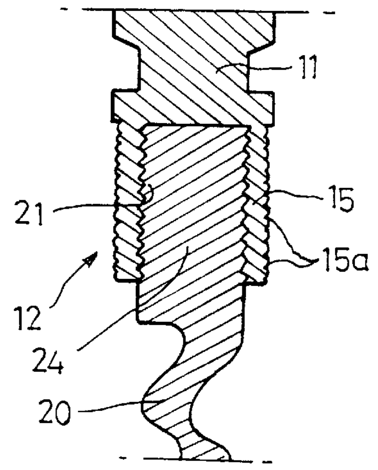

FIG. 8 to FIG. 10 show the assembly of a cuttingworked screw, wherein the screw 20 is assembled into the coupling portion 1 of the supporting shaft 11, in which a connecting portion 24 having a screw coupling portion 21 is formed at the upper end of the screw 20 and inserted into the coupling portion 12 and then the exterior of the coupling portion 12 is either pressed by a press or sealing-worked, whereby a corresponding concave and convex portion, which is the same as the screw coupling portion 21, is produced and assembled to the coupling portion.

In accordance with the present invention, since the metal-made operating lever 42 fixed to the cork-extracting device 40 having a bottle mouth supporter 41 is provided with a synthetic resin coating layer 43, the operating lever 42 can be safely gripped without slipping and external shock. Also, the operating lever 42 is not rapidly cooled or heated.

In summary, the supporting shaft 11 is inserted into the guide slot 41*a* of the bottle mouth supporter 41 which guides the ascending, descending and rotating action of the screw 20. The screw 20 has a screw coupling portion 21 formed at its upper end. The screw 20 can be wound in coil form from a wire-like metal bar or can be made as a coil by cutting a circular bar. The coupling portion 21 is inserted into the coupling portion housing 12 at the bottom end of the supporting shaft 11 and the surface of the coupling portion 12 is pressed whereby the internal surface of the press-fixing portion 14 conforms to the screw coupling portion 21 in concave and convex undulations to form the screw coupling. Alternatively, pressure is applied by applying a knurling mesh 15a to the exterior of the coupling portion 12 whereby the internal side of the sealing portion 15 conforms to and couples with the concave and convex shape of the screw 21 to form an effective assembly which is secure, inexpensive, and in perfect alignment with the center axis 35 of the supporting shaft, that is, the alignment of the center axis 35 of the supporting shaft and the screw is exact. This construction provides the advantage of being able to exactly draw the cork stopper 51 out of the bottle.

What is claimed is:

1. A method of manufacturing a cork extracting device containing a supporting shaft and a coil-type screw and in which the supporting shaft and the screw are separately made and then connected together, which comprises:

providing a bottom end portion of the supporting shaft with a coupling portion having a coupling aperture disposed therein, inserting a guiding tube into the coupling portion of the shaft, said guiding tube having a center hole which extends therethrough and branches at the end thereof as a hooking groove, and inserting the screw coupling portion of the screw into the hole of said guiding tube and bending the end of the screw coupling portion of the screw to engage with the hooking groove.

2. The method of claim 1, wherein a portion of an outer surface of the guide tube is provided with a screw coupling portion for engagement with the coupling portion of the supporting shaft.

* * * * *